United States Patent [19]

Philip

[11] 4,349,978

[45] * Sep. 21, 1982

[54] MOTORIZED FISHING APPARATUS

[76] Inventor: Charles R. Philip, Box 116, Haugen, Wis. 54841

[*] Notice: The portion of the term of this patent subsequent to Apr. 18, 1995, has been disclaimed.

[21] Appl. No.: 94,271

[22] Filed: Nov. 14, 1979

Related U.S. Application Data

[63] Continuation of Ser. No. 896,238, Apr. 14, 1978, abandoned, which is a continuation-in-part of Ser. No. 705,947, Jul. 16, 1976, Pat. No. 4,084,342.

[51] Int. Cl.³ .............................................. A01K 87/00
[52] U.S. Cl. ..................................................... 43/19.2
[58] Field of Search ..................... 43/18 R, 19.2, 26.1, 43/24

[56] References Cited

U.S. PATENT DOCUMENTS

| | | | |
|---|---|---|---|
| 173,534 | 2/1876 | Endicott | 43/24 |
| 952,812 | 3/1910 | Jorgensen | 43/18 R |
| 2,514,929 | 7/1950 | Brandt | 43/24 |
| 2,596,835 | 5/1952 | Benge | 43/24 |
| 2,632,273 | 3/1953 | Fletcher | 43/18 R |
| 3,031,790 | 5/1962 | Duryea | 43/26.1 |
| 3,835,570 | 9/1974 | Philip | 43/19.2 |
| 4,084,342 | 4/1978 | Philip | 43/19.2 |

Primary Examiner—Stephen G. Kunin
Assistant Examiner—K. Bradford Adolphson
Attorney, Agent, or Firm—Wegner, McCord, Wood & Dalton

[57] ABSTRACT

A fishing device is provided which in a single structure can be used to perform a plurality of fishing operations, such as a motorized jigging operation, a casting operation, a trolling operation and a motorized jigging trolling operation. The device imparts a lifelike swimming action and oscillatory movement to lures, to baits and to live or plastic minnows. This imparted action and movement is caused by an electric motor in the handle which revolves an eccentric striker arm to deflect a length of line positioned in the path of the striker arm. Two separate control means permit the device to impart such movements to lures and baits of differing weights, sizes, buoyancies and physical structures. The first control is a variable rheostat which varies the angular velocity of the striker arm and thus varies the rate at which the striker arm contacts the length of fishing line positioned in the path of the striker arm. The second control varies the relative position of the fishing line with respect to the striker arm. Each control varies the amount of deflection imparted to the length of line, and thus each affects the amount and type of movement imparted to the lure or bait.

6 Claims, 11 Drawing Figures

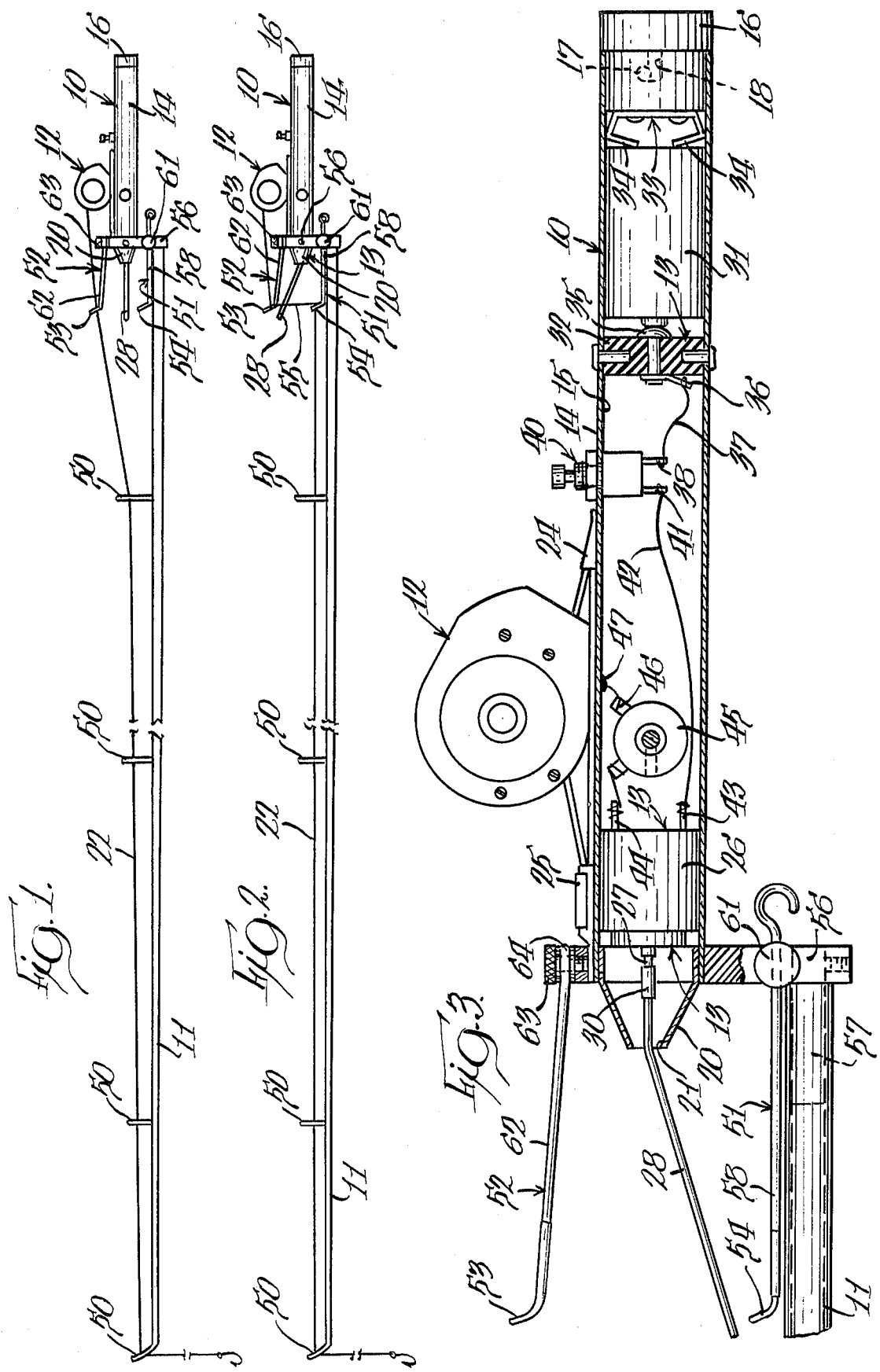

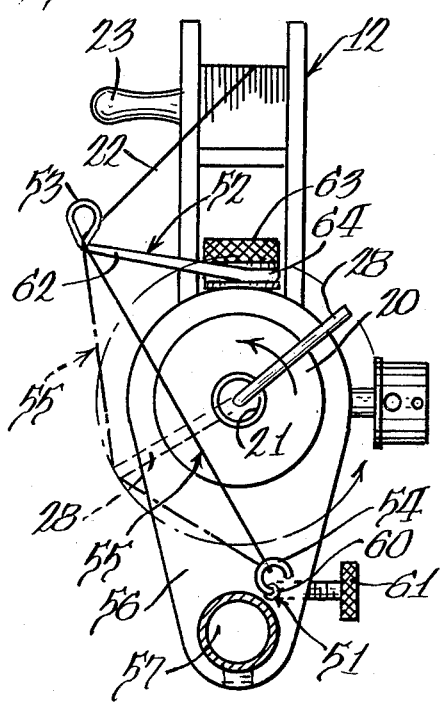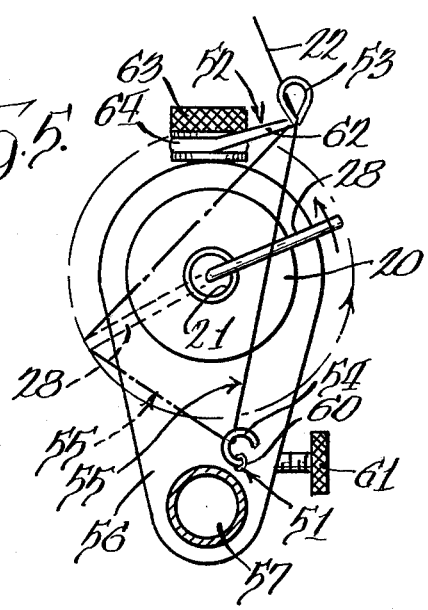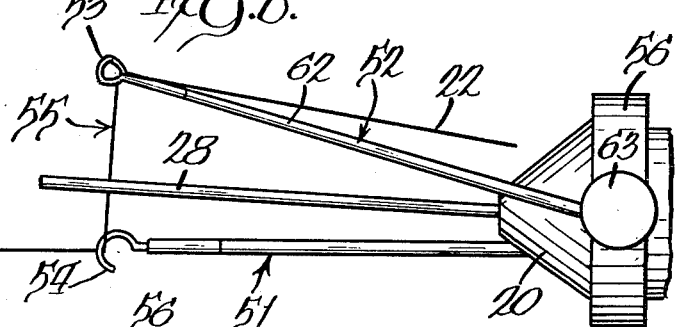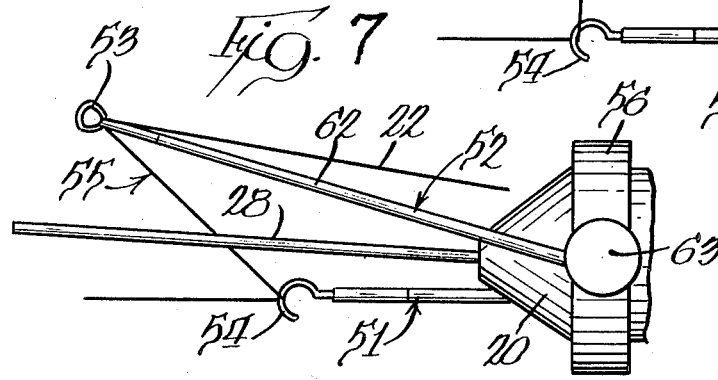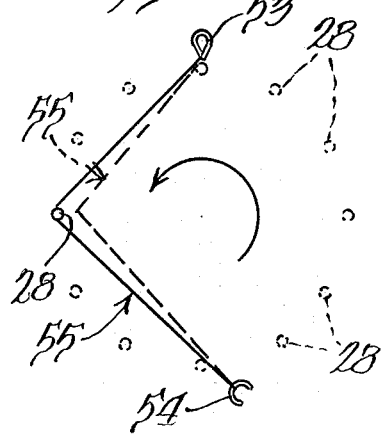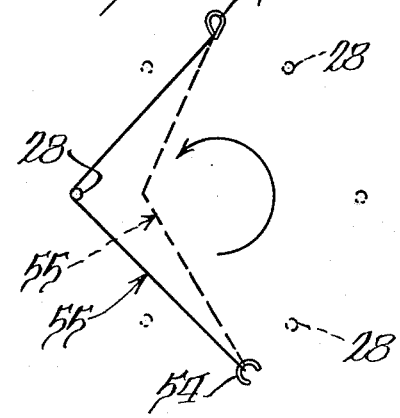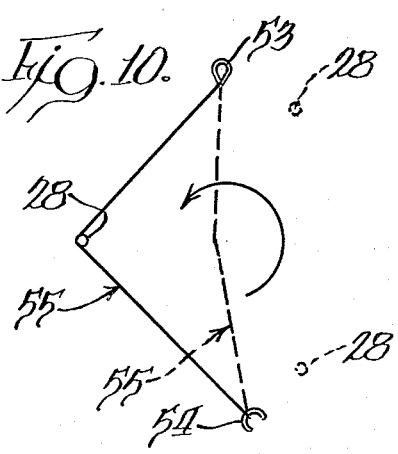

MOTORIZED FISHING APPARATUS

CROSS REFERENCE TO RELATED APPLICATIONS

The present invention is a continuation of application Ser. No. 896,238, filed Apr. 14, 1978, now abandoned which is a continuation-in-part of application Ser. No. 705,947, filed July 16, 1976, now U.S. Pat. No. 4,084,342, issued Apr. 18, 1978.

BACKGROUND OF THE INVENTION

The present invention relates to a fishing device which in a single structure can be used to perform a plurality of fishing operations.

The fishing device of the present invention can be used alternatively in a motorized jigging operation or for any normal non-jigging fishing operations such as in casting or in trolling for fish. It is particularly useful in summertime fishing and the device can be easily and quickly converted from use in one type of fishing operation to uses in the other types of fishing operations. For example, motorized jigging is particularly useful where it is desired to lower the end of the line containing the bait or lure into a small opening between lily pads where fish are likely to gather. The lure can be finely tuned by adjusting the device with the lure inserted a few inches into the water. With live minnows or plastic minnows the bait can be oscillated to impart an effective swimming action to the live or plastic minnow. The bait can then be lowered into the water where the oscillation provides a realistic swimming action to the bait to attract any fish in the area.

In the past, a number of devices have been constructed which replace manual manipulation with a mechanized device. One such device is disclosed in my U.S. Pat. 3,835,570 entitled "Motorized Fishing Device", issued Sept. 17, 1974. Therein a fishing line is rapidly vibrated and lightly jigged up and down by repeatedly striking the line with an eccentric striker arm rotatively driven by an electric motor powered by a battery.

It has been found that the rate and type of vibrating motion of the line, and the ultimate hook or bait jigging action, is controlled by a number of factors. These factors include the speed of the motor, the length and stiffness of the rod, the weight of the line, the weight of the hook and lure, and the distance the line is deflected from its normal path by the striker arm. The distance the line is deflected by the striker arm can be altered by changing the relative relationship between the striker arm and the line. If the line is oriented so that the arm causes greater deflection, the lure will move up and down to a greater extent.

The rod itself generally has some tendency to vibrate along with and as a result of the vibrating line it supports. The vibratory motion of the line is thus additionally dependent on two simultaneous actions, the rod vibration and the striker arm deflection which are themselves somewhat interdependent. The rate at which the rod vibrates is dependent on the speed of the striker arm, the extent of the deflection and the stiffness of the rod. However, the vibratory motion of the rod and effects thereupon by the rotary motion of the striker and the vibration of the line can be altered by changing the stiffness of the rod and the length of the rod. The weight of the line, as well as the configuration weight of the lure, bait, and hook will also have substantial effects on the resulting vibratory movement of the lure.

When jigging, it is important that the lure or hook and bait have an oscillatory or dancing action with only a slight up and down movement. It is this action which is believed to be most attractive to fish even when the fish are not actively biting or when they are in a lethargic condition such as in ice fishing. Violent jumping action of the lure is not usually a desirable action for attracting fish, and often frightens the fish away. Thus having the lure or the bait and hook vibrating to an extent and at a rate which attracts fish, rather than repels them, is very important in jigging.

SUMMARY OF THE INVENTION

The device of the present invention is totally integrated to provide a complete fishing tool, one which is particularly useful in summertime fishing where the normal longer rod is employed. This single integrated fishing tool provides a completely new kind of fishing capability, that is, it enables an immediate change with the same device from one type of fishing operation to another with the same tool so that anyone of a number of fishing operations may be tried to attract fish even when the fish are in a lethargic or a disinterested condition.

The devices includes a handle, a reel carried by the handle, an elongate rod having a rear portion secured to the handle and a front end portion extending forwardly of the handle, a drive motor carried by the handle, an arm spaced laterally of the rear portion of the rod and rotatively driven by the motor, an eccentric portion on the arm which moves through an arcuate path when the motor rotates the arm, and a fishing line secured at one end to the reel and having a free end suspended from the front end portion of the rod. Guide means are provided for the line to define at least a pair of separate paths for the fishing line from the reel or handle to the front end portion of the rod. A first path for the fishing line adapts the fishing line to be struck and deflected by the eccentric portion of the arm when the motor is actuated. In this first path, an intermediate portion of the line is releasably positioned upon a line guide member adjacent the handle to afford a line extension which may be adjustably positioned in the arcuate path of the eccentric portion during its rotation. This permits the device to be used in a jigging operation during slow trolling activity in a boat, or in simply lowering the line vertically into a desired area and depth in the water from a stationary boat. A casting operation or a more rapid trolling operation can be immediately performed by placing the fishing line in a second path which leads from the handle or reel to the front end of the rod. Since the line extension is releasably held by the line guide member adjacent the handle, the line may be removed from this line guide member so that the fishing line is then directed forwardly through the remainder of the guide means to the end of the elongate rod in the normal manner of the ordinary casting rod.

As pointed out above, in jigging, it is important that the lure be "fine tuned" to provide an oscillatory or dancing action with only a slight up and down movement. The device of the present invention provides additional structural control features to control this jigging action in an improved manner. These additional features are particularly important where the rod is longer, such as six to ten feet, so that there may be greater vibration in the rod to be considered and where there are greater lengths of the fishing line to be controlled in the jigging action. One of these features is the incorporation of control means, herein a rheostat, which is electrically connected to the motor to vary the angular velocity of the striker arm. As will be explained more completely hereinafter, as the angular velocity of the eccentric portion of the arm is decreased, the fishing line being struck is deflected in a greater amount. This deflection of the fishing line and its effect upon the jigging movement of the lure or bait and hook can be observed by placing the lure a few inches below the surface of the water and making controlled adjustments until the desired jigging action is obtained. Especially, with minnows, whether real or plastic, the dancing oscillatory motion of this bait can give to the minnow the appearance of a swimming action. Such an appearance of a live swimming action enhances the chances of catching even the most lethargic of fish.

To improve the jigging action, improved adjustable line guide members are also provided in the present device adjacent the handle. One of the guides is longitudinally adjustable of the rod as in my prior pending patent application. A second line guide is movably adjustable laterally of the rod so that the line extension being struck by the eccentric portion can be varied greatly in relation to the eccentric portion of the arm. With the present guide members, the line extension can be moved longitudinally of the rod and the line extension can also be moved laterally of the rod which increases the capabilities of adjustment in the jigging action imparted to the lure. By these adjustments, it can be seen also that a different part of the eccentric portion can be brought into contact with the line extension which again will alter the amount of deflection imparted to the line extension. Each of these features contributes to the improved control and variance of the jigging action imparted to the lure or bait and hook.

BRIEF DESCRIPTION OF THE DRAWINGS

FIG. 1 is a broken side elevational view of the fishing device of this invention showing the fishing line directed in a path in the device in which a normal casting operation or trolling operation can be performed with the line extension of the fishing line being removed from potential contact with the rotatable eccentric portion of the striker arm;

FIG. 2 is a broken side elevational view of the device shown in FIG. 1 showing the fishing line positioned in a different path by the guide means in which a portion of the line adjacent the handle is releasably received in an open eyelet guide member to afford a line extension positioned in the arcuate path of the rotatable eccentric portion of the striker arm so that the device can be used in a vertical jigging fishing operation or in a slow trolling jigging fishing operation;

FIG. 3 is an enlarged side elevational view of the handle assembly with the elongated rod broken away and the housing of the handle assembly being in longitudinal section to show the position of the operating parts therein;

FIG. 4 is an end elevational view of the handle assembly taken from the left of FIG. 3 with the rear end of the rod in section illustrating a first position of a line extension between the rear pair of line guide members and illustrating in dotted outline the deflection imparted to the line extension by the eccentric portion of the rotatable arm;

FIG. 5 is a view similar to FIG. 4, but with the reel and the rheostat removed for clarity of illustration, showing the upper line guide member in a right-hand position to place the fishing line extension in a second position in which the eccentric portion of the rotatable arm causes a greater deflection in the line extension to increase the magnitude of movement imparted to the fishing line and to the lure on the free end portion of the fishing line;

FIG. 6 is a broken top plan view of the handle assembly with the rod removed for clarity of illustration showing the line guide member with the open eyelet guide in a forward position so that the line extension is in position to be struck by the forward end of the eccentric portion of the rotatable arm;

FIG. 7 is a view similar to FIG. 6 but showing the line guide member with the open eyelet guide in a rearward position to place the line extension in a differing position from that shown in FIG. 6 so that the line extension will be struck by an intermediate part of the eccentric portion of the rotatable arm;

FIG. 8 is a diagrammatic view showing the upper and lower line guide members of FIGS. 4 through 7 with the fishing line extension in a deflected position caused by being struck by a part of the eccentric portion of the rotating arm, (shown in circular outline) the plurality of circular outlines indicating a high angular velocity of the eccentric portion of the arm of about 2000 rotations per minute, the dotted line portion indicating that the fishing line extension retracts toward a linear position a smaller amount before being struck by the eccentric portion on its next rotation;

FIG. 9 is a view similar to FIG. 8 and diagrammatically illustrates a decreased angular velocity of the eccentric portion of the rotating arm by rheostat control means associated with the motor so that the line extension in dotted outline returns further toward a linear position before being struck again by the eccentric portion;

FIG. 10 is a view similar to FIGS. 8 and 9 and diagrammatically illustrates a further reduction in the angular velocity of the eccentric portion of the rotating arm such that the line extension under gravity will move further toward a linear position before being struck again by a part of the eccentric portion of the rotating arm; and FIG. 11 is a diagrammatic view of the electric circuit for actuating the motor and showing the rheostat for controlling the motor and the angular velocity of the eccentric portion of the rotating arm.

DESCRIPTION OF THE PREFERRED EMBODIMENT

A fishing device constructed according to the present invention includes a handle assembly, generally designated 10, a thin tapered elongate rod 11, a storage reel, generally designated 12, and a motorized line striking assembly, generally designated 13. Both the rod 11 and the reel 12 are operatively carried by the handle 10.

The handle assembly includes a tubular housing 14 which affords an inner chamber 15, and which carries or mounts the motorized line striking assembly 13. The handle housing is closed at its rear end by a rear end cap 16 which is detachably secured in position by a stud 17 shaped to fit within a bayonet type slot 18 in the side wall of the housing 14. The front end of the housing 14 is enclosed by a nose cone 20 of metal or plastic which is secured to the housing by cap screws (not shown), and which has an opening 21 on its forward end.

The reel 12 carries a quantity of fishing line 22, preferably of the monofilament type, for use with the fishing device. The reel 12 is of a conventional type and is rotatable by reel handle 23 to dispense fishing line 22 from its storage position on the reel or to wind fishing line upon the reel into a storage position. As shown herein, the reel 12 is removably mounted in reel seats 24 and 25.

The motorized line striking assembly 13 includes a small electric motor 26 secured within the forward portion of the housing chamber 15 and having a forwardly projecting rotatable arm 27 which is operatively joined to an eccentric portion 28 by a tubular coupling 30. Thus when the motor 26 is actuated, the arm 27 is caused to rotate and swings the eccentric portion through an arcuate path spaced laterally of the rod 11.

A source of power 31 is mounted in the rear end of the housing 14. As herein shown, this source of power is a "C" size dry cell battery, but it is contemplated that a battery of a rechargeable type can be used as the source of power. The battery fits snugly within the tubular housing and is preferably securely confined between a forward positive battery terminal block 32 and a rear negative battery terminal 33. The rear terminal 33 is in the form of conductive metal spring fingers 34 which are secured to the inner end of the rear end cap 16 and which bear in electrically conducting engagement against the bottom of the battery and against the inner side walls of the chamber 15 to hold the positive terminal of the battery firmly against the forward terminal block 32. The terminal block 32 has an electrically conductive rivet 35 therethrough which affords a positive battery terminal 36 for a conductive wire 37 which is connected to the terminal 38 on one side of a push button switch 40. The switch 40 is spring urged to inactive position and actuates the circuit only when it is pushed downwardly against the action of the spring. The switch is conventionally mounted in the side wall of the housing as best shown in FIG. 3. The forward switch terminal 41 makes an electrical connection through wire 42 to a motor terminal 43. A second motor terminal 44 is electrically connected to one side of a rheostat 45, and the other terminal 46 of the rheostat is preferably grounded by a connection with the housing as at 47.

Thus when the push button switch 40 is depressed, the electric circuit is actuated so that the drive motor 26 rotates the arm 27 and its eccentric portion 28 through an arcuate path spaced laterally of the rod 11. The motor generally turns at the rate of about 1800 to 2200 rotations per minute. By rotating the rheostat 45, additional resistance can gradually be placed into the operative circuit so that the rate of rotation of the motor and of the eccentric portion can be slowed. For example, the angular velocity of the eccentric portion 28 can be reduced to a rate of 400 to 600 rotations per minute, or even less if that is desirable. The use of the rheostat as a control means will also enable the eccentric portion 28 to be used at intermediate angular velocities, for example at a rate of 900 to 1200 rotations per minute. It is this rheostat or control means which performs an important function in varying the magnitude of line deflection which in turn varies the degree of jigging movement imparted to the free end of the fishing line, as will be explained in greater detail later.

As pointed out earlier, an important feature of the present fishing device is that its structure enables a fisherman to use the same device for a plurality of fishing operations. Referring to FIG. 2, guide means are shown which direct the fishing line 22 from its securement to the handle assembly on a first path to the front end portion of the rod 11. When occupying this first path, a jigging operation may be performed on the fishing line by the motorized line striking assembly 13, and in particular by the eccentric portion 28.

As shown herein, the line guide means includes a number of conventional eyelet guides 50, a first line guide member, generally designated 51, and a second line guide member, generally designated 52. In the first path of the fishing line, or the jigging path of the fishing line, the fishing line passes through aperture guide 53 of line guide member 52, then the line is releasably inserted in open eyelet guide 54 of first line guide member 51, and finally the line is fed or directed through eyelet guides 50 on the rod 11 to the end guide on the rod where the line is suspended in fishing position for a fishing operation. Between aperture guide 53 and open eyelet guide 54 adjacent the front end of the handle assembly, there is a line extension 55 which by adjustment may be positioned in the arcuate path of the eccentric portion so that this line will be struck during the rotation of the eccentric portion and will be deflected to impart jigging movement to the free end of the fishing line suspended from the end of the rod. When a jigging operation is being performed with the line in the position of FIG. 2, a fisherman may utilize the fishing device during a slow trolling operation or he may utilize the fishing device with the line vertically inserted into the water. In either type of jigging fishing the movement of the lure or bait and hook at the end of the fishing line can be closely controlled.

By varying the angular velocity of the eccentric portion 28 of the rotatable arm 27 by use of the control means such as rheostat 45, the magnitude of deflection in the line extension 55 can be controlled which in turn will vary the movement and dancing oscillation of the lure or bait at the end of the fishing line. This effect is diagrammatically illustrated in FIGS. 8, 9 and 10. These drawings are not to scale and are simply made to illustrate the principle involved. In FIG. 8, the eccentric portion 28 is rotating at a rapid angular velocity. Thus the line extension 55 has very little time to recover under the influence of gravity from its initial strike by the eccentric portion 28 for a mere instant later it is struck again. Thus there is an initial large deflection followed successively by a series of smaller deflections. Such rapid action may be acceptable with rods of a certain stiffness or of a certain length or with lines and lures of a certain type and weight, but with other rods, lines and lures the slight jigging action may be almost imperceptible and unacceptable for jigging type fishing.

Thus if the angular velocity of the eccentric portion 28 is slowed as indicated in FIG. 9 and FIG. 10, each striking of the eccentric portion causes a larger magnitude of deflection in the line extension and thus imparts greater movement and oscillatory dancing to the lure at the end of the line. Thus this variance in angular velocity is important because it adapts this motorized line striking assembly 13 for effective use with rods, lines and lures which present a multiplicity of varying problems through varying lengths, varying stiffness and varying weights of lines and lures.

FIG. 11 shows the schematic electrical system by which the motorized line striking assembly 13 is actuated and how it is controlled by the use of rheostat 45.

Referring to FIGS. 4 and 5, a second means is shown for varying the magnitude of deflection in the fishing line extension 55. This feature includes the structure and cooperative relationship between the first line guide member 51 and the second line guide member 52. As best shown in FIGS. 3 and 4, a front mounting plate or block 56 encircles the front end of housing 14 and is secured thereto by machine screws (not shown). The mounting plate 56 depends from the front end of the housing and has secured thereto a rod mounting ferrule 57 to which the rear end portion of the rod 11 is securely fastened.

The first line guide member has a guide arm 58 which is slidably received in a bore 60 through the mounting plate 56. The line guide member 51 can be held in varying positions of extended longitudinal adjustment by a lock screw 61 shown best in FIGS. 4 and 5. The longitudinal adjustment of line guide member 51 is also illustrated in FIG. 6 and in FIG. 7. It should be noted that the open eyelet guide 54 of the first line guide member 51 is arranged during a jigging operation so that the deflection of the line extension 55 always tends to move the fishing line 22 away from the open portion of the open eyelet guide 54 as can best be seen in FIGS. 4 and 5.

The second line guide member 52 preferably includes a pivoted arm member 62 which carries the aperture guide 53 at its free end. As best seen in FIGS. 4 through 7, the arm member 62 is pivotally mounted on the top portion of the front mounting block 56 by a pivot arm lock screw 63. As shown herein, the pivoted arm member is secured in various positions in pivoted adjustment by the lock screw 63 which passes through the rear apertured end 64 of the arm member 62.

The aperture guide 53 for the fishing line can be selectively moved laterally of the rod 11 from a left-hand position as shown in FIG. 4 to a pivoted right-hand position as shown in FIG. 5. Such a change in the position of aperture guide 53 effects a change in relative position of the line extension 55 with respect to the rotating eccentric portion 28 so that a greater deflection in the line extension occurs in FIG. 5 than that shown in FIG. 4. Thus guide member 52 also is an important control in regulating the magnitude of line deflection and thus the character and magnitude of movement imparted to the lure or bait at the end of the line.

In addition, it is clear that the line guide members 51 and 52 are mutually, cooperatively adjustable to closely control the magnitude of deflection of the line extension 55. Line guide member 52 positions the line extension in varying positions laterally of the axis of the rod; while at the same time line guide member 51 can be used to position the line extension 55 longitudinally of the rod 11 so that the line extension 55 can be deflected by differing parts of the eccentric portion, which parts swing arcuately on different radii with respect to the axis of the rotatable arm 27. Thus a great range of deflecting line adjustment is provided by this feature of the line deflecting control means.

In FIG. 1 the fishing device of the invention is shown with the fishing line 22 positioned by guide means in its second path for a normal non-jigging fishing operation or operations. When the fishing line is positioned in its second path, the fishing device is conditioned to perform a normal casting fishing operation, a normal fishing trolling operation, or any other normal type of fishing endeavor.

To perform these normal fishing operations, a fisherman need only releasably disengage the fishing line extension 55 from the open eyelet guide 54 of the first line guide member 51 so that the fishing line 22 then extends forwardly from the handle 10 or reel 12 through the guide means of the rod including the eyelet guides 50 and the aperture guide 53 of the second line guide member 52. At this time the motorized line striking assembly 13 is not actuated because there is no line extension 55 positioned in the path of arcuate movement of the eccentric portion 28.

To resume a motorized type of jigged operation, it is merely necessary to place a portion of the fishing line 22 adjacent the handle in the open eyelet guide 54 of the front line guide member 51 to again form the fishing line extension 55 (as in FIG. 2) so that the fishing line extension occupies a position in the arcuate path of the rotatable eccentric portion. The motorized line striking assembly 13 can then be actuated by the push button switch 40 to cause the eccentric portion to deflect the line extension so as to impart jigging movement to the free end of the fishing line 22.

Appropriate adjustment to control the jigging action can then be made with one or more of the control means, namely, the rheostat 45 and the adjustable line guide members 51 and 52. With these jigging control means the proper jigging action can be imparted to the lure or to the bait to counteract the varying factors affecting jigging which may be present in various fishing devices with which the present motorized jigging device may be used, such factors as the relative stiffness and resiliency of the rod, the relative length of the rod, the friction of the line in the guides, and the varying weights of the lines or lures which may be used.

I claim:

1. A fishing device, comprising: a handle; an elongate rod having a rear end portion and a projecting forward end portion, the rear end portion being secured to the handle; line guide means positioned forwardly of the handle, said line guide means including a line guide member; a fishing line secured at one end to the handle and having a free end provided with bait means and/or lure means and being suspended from the forward end portion of the rod, the line extendng through the line guide means to afford a line extension spaced from the rod and extending between the handle and the line guide means, the line extension being normally urged toward a straight-line condition by gravity applied to the free end of the line; a drive motor carried by the handle; an arm spaced laterally of the rod and rotatively driven by said motor, said arm having an eccentric portion which moves through an arcuate path when the motor rotates the arm, the eccentric portion being positioned to engage and deflect said line extension to cause movement of the free end of the line; a rheostat electrically connected to the motor for varying the speed of rotation of the motor and the angular velocity of said arm so as to vary the deflection of the line extension by the eccentric portion and the range of movement of the free end of the line and to afford a first way of adjusting the magnitude of deflection of said line extension; and adjustable means are provided for the line guide member to afford selective adjustable movement to said line guide member to vary the position of the line extension with respect to the eccentric portion of the arm so as to change the magnitude of deflection of the line extension and to afford an additional way of adjusting said magnitude of deflection.

2. A fishing device as specified in claim 1 in which the adjustable means permit the line guide member to be moved laterally of the rod to vary the position of the line extension with respect to the eccentric portion of the arm to afford said additional way of adjusting said magnitude of deflection.

3. A fishing device as specified in claim 1 in which the line guide means includes a pair of line guide members, the first line guide member being adjustable longitudinally of the rod and the second line guide member being adjustable laterally of the rod, the fishing line extending from the handle and between each of said line guide members to afford the line extension therebetween, each line guide member being selectively adjustable to vary the position of the line extension with respect to the eccentric portion of the arm so as to change the magnitude of deflection of the line extension and to afford said additional way of adjusting said magnitude of deflection.

4. A fishing device as specified in claim 1 in which the line guide means includes a pair of line guide members, the fishing line extending from the handle and between each of said line guide members to afford the line extension therebetween, one of the line guide members including an elongate support arm pivotally mounted on the handle to provide adjustment of said one line guide member laterally of the rod whereby the position of the line extension can be varied with respect to the eccentric portion of the arm so as to change the magnitude of deflection of the line extension and to afford said additional way of adjusting said magnitude of deflection.

5. The fishing device as specified in claim 1 in which the line guide means also includes a line releasing guide member having a closed portion and an open portion to afford an open eyelet in which the fishing line may be engaged without removing the fishing line from the remainder of the line guide means, said line guide means selectively defining a first path and a second path for the fishing line from the handle to the front end portion of the rod, the first path for the fishing line being engaged within said open eyelet to afford a fishing line extension between the handle, the line guide member and said line releasing guide member, and the second path for the fishing line being formed by removing said fishing line extension from said open eyelet to eliminate said line extension so that the fishing line intermediate the handle and the front end portion of the rod is directed by the line guide member and the remainder of the line guide means to enable the fishing line to be used in a normal fishing operation in which the fishing line is not deflected by the eccentric portion of the arm.

6. A fishing device as specified in claim 5 in which the direction of rotation of said eccentric portion of the arm urges the line extension when deflected against the closed portion of the open eyelet.

* * * * *